United States Patent Office 3,410,815
Patented Nov. 12, 1968

3,410,815
WATER DILUTABLE SALTS OF ADDITION CO-
POLYMERS OF (1) AN ACID, (2) AN ETHER, (3)
A CARBOXYL-FREE MONOMER AND (4) A DRY-
ING OIL ADDUCT
Thomas Leighton Phillips, Dinas Powis, Glamorgan, and
Thomas Hunt, Cadoxton, Barry, Glamorgan, Wales, as-
signors to The Distillers Company Limited, Edinburgh,
Scotland, a British company
No Drawing. Filed Feb. 4, 1965, Ser. No. 430,491
Claims priority, application Great Britain, Feb. 15, 1964,
6,416/64
7 Claims. (Cl. 260—23.5)

ABSTRACT OF THE DISCLOSURE

Addition copolymers are formed by the copolymeriza-
tion of (1) an adduct of a compound which functions
as an unsaturated oil with an acylic $\alpha$-unsaturated ole-
finic carboxylic acid having a straight chain length of
up to 5 carbon lengths or simple derivatives thereof; (2)
a polyethylenically unsaturated compound having at least
one $B,\gamma$-ethylenically unsaturated ether group and a
polymerizable ethylenically unsaturated group; (3) an
$\alpha,\beta$-ethylenically unsaturated carboxylic acid; and (4) at
least one ethylenically unsaturated monomer free from
carboxylic acid and carboxylic acid anhydride moieties
capable of forming addition polymers with other addi-
tions of copolymer, the copolymer having an acid value
of at least 25 milligrams of potassium hydroxide per
gram. Salts of these addition polymers can be diluted to
form a basis for aqueous surface coating compositions
which dry in air to form films and coatings which rapidly
harden. The resultant films and coatings are water
miscible insoluble and exhibit durability and a good ap-
pearance.

The present invention relates to addition copolymers,
methods for their preparation, water dilutable salts there-
of, a method for preparing these salts and to aqueous
compositions thereof suitable for use as surface coatings
or films.

It is an object of the present invention to provide
addition copolymers whose salts can be diluted to form a
basis for aqueous surface coating compositions which are
capable of drying in air to give films or coatings which
rapidly harden due to autoxidation. The resultant films
or coatings are water insoluble and have good appearance
and durability.

The present invention is an addition copolymer com-
prising units formed by the copolymerisation of (1) an
adduct of a compound functioning as an unsaturated oil,
as herein defined, with an acyclic $\alpha$-unsaturated olefinic
polycarboxylic acid having a straight chain length of up
to 5 carbon atoms or simple derivatives thereof, (2) a
polyethylenically unsaturated compound containing at
least one $\beta,\gamma$-ethylenically unsaturated ether group and a
polymerisable ethylenically unsaturated group, (3) an
$\alpha,\beta$-ethylenically unsaturated carboxylic acid and (4) at
least one ethylenically unsaturated monomer free from
carboxylic acid and carboxylic acid anhydride groups
capable of forming addition copolymers with the other
components of the copolymer, said copolymer having an
acid value of at least 25 milligrams of potassium hydrox-
ide per gram.

By a compound functioning as an unsaturated oil is
meant throughout this specification a drying oil which
consists of or comprises a triglyceride ester of an un-
saturated fatty acid having at least 12 carbon atoms in the
carbon chain containing the unsaturation or other esteri-
fied derivative of a drying oil acid which acts as the oil
itself. Examples of unsaturated oils are the "non-yellow-
ing" drying oils such as soya, safflower seed or tobacco
seed oil and drying oils such as tung, oiticica, linseed, cot-
ton seed, dehydrated castor, perilla, unsaturated fish oils
and the glyceride esters of tall oil fatty acids. Examples
of suitable derivatives of unsaturated oils are esters of
the fatty acids obtained from the oils with alcohols other
than glycerol (particularly mono or polyhydric alcohols
containing up to 5 carbon atoms) e.g. the methyl, glycol
or polyglycol, trimethylol ethane, trimethylol propane and
pentaerythritol esters. The preferred drying oils are
safflower and tobacco seed oil.

The other component of the adduct is any acyclic $\alpha$-un-
saturated olefinic polycarboxylic acid having a straight
chain length of up to 5 carbon atoms and including
simple derivatives thereof. Suitable polycarboxylic acids
are fumaric, maleic, aconitic, itaconic and alkyl substituted
maleic acids. The preferred acid is fumaric. Simple de-
rivatives of these acids include anhydrides such as citra-
conic anhydride, citric acid when subjected to conditions
under which citraconic anhydride or itaconic acid is
formed (Bernthsen, Textbook of Organic Chemistry 1932,
pp. 250–256) and partial esters where the acid is a poly-
carboxylic e.g. maleic acid partially esterified with an
aliphatic alcohol.

The reaction procedures by which the adduct can be
formed are known and it can be prepared using these
known procedures. When the acyclic $\alpha$-unsaturated ole-
finic polycarboxylic acid is fumaric acid it is preferred
to make the adduct from a mixture containing from 5–30
percent by weight of this acid. The adduct is preferably
formed by heating the components for an extended period
of time at a temperature of at least 110° C. and below
300° C. until substantially all the acyclic olefinic poly-
carboxylic acid is chemically combined with the compound
functioning as the oil. When the components are fumaric
acid and linseed oil the preferred reaction temperature is
between 200 and 240° C.

Component (2) from which the addition copolymers
can be formed is any polyethylenically unsaturated com-
pound containing at least one $\beta,\gamma$-ethylenically unsaturated
ether group and a polymerisable ethylenically unsaturated
group.

When the compound contains only one $\beta,\gamma$-ethylenically
unsaturated ether group the remaining polymerisable
ethylenically unsaturated group may for example consist
of a vinyl group. The preferred compounds are the allyl,
methallyl or ethallyl ethers of alcohols or epoxy com-
pounds having a straight chain length of at most 12 car-
bon atoms. Examples of suitable alcohols are sorbitol,
glycol and trimethylol propane. Some examples of suit-
able ethers are vinyl allyl ether, diallyl ether, vinyl
methallyl ether, the glycerol diallyl ethers, the trimethylol
propane diallyl ethers, glycerol triallyl ether, ethyene gly-
col diallyl ether, pentaerythritol di, tri and tetra allyl
ethers and the corresponding methallyl ethers and sorbitol
tetra allyl ether and its corresponding methallyl ethers.
The polyethylenically unsaturated compound can contain
free hydroxyl groups which can be esterified or partially
esterified with unsaturated drying oil fatty acids such as
dehydrated castor oil fatty acids preferably before addi-
tion polymerisation to form the copolymer. They can
also be esterified with acyclic olefinic carboxylic acids to
form esters such as the ethylene glycol mono allyl ether
mono ester of maleic acid. The preferred compound con-
taining at least one $\beta,\gamma$-ethylenically unsaturated ether
group is a glycerol diallyl ether.

Component (3) from which the addition copolymers
can be formed can be any $\alpha,\beta$-ethylenically unsaturated
caboxylic acid. Most suitably the acids are mono- or
dibasic. The preferred acids are mono and dicarboxylic
acids having a straight chain length of at most 5 carbon atoms such as acrylic and methacrylic acid or maleic acid or itaconic acid.

Component (4) from which the addition copolymers can be formed is any ethylenically unsaturated monomer free from carboxylic acid and carboxylic acid anhydride groups which is capable of forming addition copolymers with the other components.

Most suitably the monomers are aromatic compounds containing vinyl unsaturation or vinyl esters or esters of $\alpha,\beta$-ethylenically unsaturated carboxylic acids or amides. Typical examples may be selected from the following monomers, vinyl toluene, styrene and the di- substituted lower alkyl styrenes having up to 4 carbon atoms in the alkyl group such as a $\alpha$-methyl styrene and alkyl esters of acrylic and methacrylic acids. Suitable vinyl esters are vinyl acetate and vinyl propionate. Suitable acrylate and methacrylate esters are the methyl, ethyl, butyl and octyl esters. Mixtures of two or more of these monomers can be used.

The units of the addition copolymers most suitably contain residues of the components (1), (2), (3) and (4) as hereinbefore described in the following proportions by weight in relation to their total weight.

The residues of the polyethylenically unsaturated compound having at least one $\beta,\gamma$-ethylenically unsaturated ether group (2) desirably comprises from 15-40 percent by weight of the total weight.

The procedure by weight of the residues of the adduct of the compound functioning as an unsaturated oil with an acyclic olefinic dicarboxylic acid having a straight chain length of up to 5 carbon atoms (1) in relation to the total weight desirably comprises from 5-60 percent.

The residues of the polyethylenically unsaturated compound containing $\beta,\gamma$-ethylenically unsaturated ether groups together with those of the adduct should preferably form between 20 to 80 percent.

The residues of the $\beta,\gamma$-ethylenically unsaturated monomer free from carboxylic acid and carboxylic anhydride groups (4) should preferably form at least 10 percent.

The proportion of the residues of the $\alpha,\beta$-ethylenically unsaturated carboxylic acid (3) initially present depends principally on the acid number desired in the copolymer. The copolymer must have an acid value of at least 25 milligrams of potassium hydroxide per gram before the formation of its salt, most suitably an acid value of from 25 to 100 milligrams of potassium hydroxide per gram and preferably 40 to 70. Thus where the residues of the polyethylenically unsaturated compound containing $\beta,\gamma$-ethylenically unsaturated ether groups together with those of the adduct initially present are in the proportion of from 20 to 80 percent the proportion of the residues of the $\alpha,\beta$-ethylenically unsaturated carboxylic acid is most suitably from 2 to 10 percent, with the balance being residues of the ethylenically unsaturated monomer or monomers free from carboxylic acid and carboxylic anhydride groups (4). Preferably at least 10 percent of residues of component (4) should be present.

The acid value must be determined by a method which estimates each carboxylic anhydride group present in the copolymer as two carboxylic acid groups.

The addition copolymers of the present invention can be prepared by reacting a monomeric mixture of the components using known techniques for addition polymerisation. The preferred proportion of the monomers used to form the copolymer are the same as those hereinbefore given for the residues of components (1), (2), (3) and (4) with the exception of the polyethylenically unsaturated compound having at least one $\beta,\gamma$-ethylenically unsaturated ether group (2) which can comprise from 15-75 percent by weight of the total weight of the other monomers. The polymerisation techniques includes heating a monomeric mixture of the components in the presence of a free radical catalyst under reflux at atmospheric pressure. The temperature can vary over a wide range but is preferably from 50 to 200° C. Examples of suitable free radical catalysts are azo-bis-isobutyronitrile or organic peroxides or hydroperoxides such as ditertiary butyl peroxide, benzoyl peroxide and cumene hydroperoxide.

All the monomeric components can be mixed together and then polymerised. Alternatively one or more components of the reaction mixture can be added to the other components during the copolymerisation reaction for example the catalyst, the $\alpha,\beta$-ethylenically unsaturated carboxylic acid and the ethylenically unsaturated monomer free from carboxylic acid and carboxylic anhydride groups can be added slowly to a mixture of the adduct and the $\alpha,\beta$-ethylenically unsaturated carboxylic acid whilst stirring at the temperature of polymerisation.

A preferred process for preparing addition copolymers according to the present invention comprises addition polymerising a monomeric mixture containing the compounds (1), (2), (3) and (4) as hereinbefore described in the presence of a chain stopper as herein defined, to give a copolymer having an acid value of at least 25 milligrams of potassium hydroxide per gram.

It is desirable to use this preferred process to prevent gelation and limit the molecular weight of the copolymer when the amount of polyethylenically unsaturated compound containing $\beta,\gamma$-ethylenically unsaturated ether groups together with the adduct is at the lower end of the preferred range of between 20 to 80 percent by weight of the components present in the polymerisable mixture or when the amount of adduct is at the lower end of its preferred range.

By the term chain stopper is meant throughout this specification and claims a compound which has a chain transfer constant for styrene polymerisation at 60° C. of at least $0.5 \times 10^{-4}$. Some examples of chain stoppers are solvents such as allyl alcohol, $\alpha$-methyl styrene dimer and chlorinated hydrocarbons such as carbon tetra chloride. Minor quantities of drying oil acids can also be used, and small amounts of compounds having very high chain transfer constants for example mercaptans such as dodecyl mercaptan.

Where the chain stopper is a solvent such as allyl alcohol or a chlorinated hydrocarbon such as carbon tetra chloride the proportion of solvent in relation to the total weight of monomer material from which the copolymer can be formed can vary widely and is dependent upon the tendency of the particular mixture to gel. In general the proportion need not be more than the 60 percent by weight of the total monomer. Compounds having very high chain transfer constants can be used by dissolving them in small amounts in the polymerisable monomer to give the required chain transfer value.

The chain stopper can be introduced at intervals during the polymerisation or the total amount can be present before polymerisation is initiated. It is convenient to introduce it during the polymerisation admixed with the $\alpha,\beta$-ethylenically unsaturated carboxylic acid.

The unreacted monomers can be removed by distillation when the polymerisation has proceeded to the desired extent. When the amount of component (2) initially present in the monomeric mixture approaches the upper-limit of the range 15 to 75 percent it may be necessary to remove some unreacted monomer to obtain a completely water soluble product. This may be done using normal distillation under atmospheric or reduced pressure or steam distillation may be used.

The addition copolymers according to the present invention are water dilutable. By water dilutable is meant throughout this specification and claims that the addition copolymer in the presence of a base can be either dissolved in water or in water containing a water miscible solvent or dispersed to form an emulsion in water or water containing a water miscible solvent, the formed solution or emulsion capable of being diluted with water without precipitation occurring. Examples of suitable water miscible solvents are ethyl, propyl, and butyl alcohols and bptyl, ethyl and methyl Cellosolve.

The present invention is further a method for preparing water dilutable salts of the addition copolymers according to the present invention which comprises treating the addition copolymer with a base in the presence of water or water containing a water miscible solvent.

Preferably sufficient base is used to neutralise all the carboxyl groups in the resin. The treatment can be carried out at room temperature, but any temperature up to 100° C. can be used.

The preferred bases are ammonia or volatile organic bases such as triethylamine since they are at least partially removed by evaporation when aqueous compositions containing the salts of the addition copolymers are applied to form coatings or films. However the less volatile organic bases such as diethylamine ethanol, and ethanolamine and the inorganic bases such as lithium and sodium hydroxides may be used if desired.

Aqueous solutions or emulsions of these water dilutable salts of addition copolymers form valuable surface coating compositions such as film forming paints and the like. The usual metallic driers, e.g. cobalt naphthenate, fillers and pigments are generally present in these compositions. It is often advantageous to add water miscible solvents such as butyl or methyl Cellosolve to the compositions in order to improve water solubility, cut viscosity and adjust flow characteristics.

The aqueous compositions of salts of the addition copolymers of this invention can be applied to surfaces in the usual manner, such as by dipping, flow coating, electrodeposition or spraying. They can then be air dried or converted to their final hardened state by heating.

The improved air drying properties of addition copolymers according to the present invention are particularly advantageous when the "non-yellowing" drying oils are incorporated in them.

The invention is illustrated by the following examples.

Example 1

A fumaric acid-tobacco seed oil adduct was first prepared by heating tobacco seed oil (2250 gms.) and fumaric acid (250 gms.) at 220–225° C. under nitrogen until a sample of the reaction mixture remained clear when cooled to room temperature. Approximately 5 hours heating at 220–225° C. was required to reach this stage.

The adduct (258 gms.), glycerol diallyl ether (120 gms.), acrylic acid (14.4 gm.), vinyl toluene (127.6 gm.) and ditertiary butyl peroxide (2.6 gm.) were stirred and heated to 120° C. under reflux. The temperature was held at 120° C. for 1 hour and then raised to 150° C. After heating at 150° C. for 2 hours, ditertiary butyl peroxide (2.6 gm.) was charged and heating at 150° C. continued for a further 2 hours. Finally the copolymer which had an alcoholic acid value 60 mg. KOH/gm. was cooled below 100° C. and converted to its triethylamine salt by charging water (49 gms.) followed by triethylamine (59 gms.). This solution was heated at 90–95° C. under reflux for 4 hours and cooled to room temperature. The alcoholic acid value of the copolymer was detedmined by titrating a solution of the copolymer in benzene/alcohol with an N/2 solution of potassium hydroxide in alcohol.

Water dispersible cobalt driers (0.12% cobalt on solid resin) were added to the above triethylamine salt solution which was then thinned with water to a reasonable viscosity for film application. Films were touch dry in 3–4 hours and hard dry after air drying overnight. The films were glossy and almost colourless.

Example 2

A fumaric acid-safflower seed oil adduct was prepared by heating fumaric acid (250 gms.) and safflower seed oil (2250 gms.) at 220–225° C. under nitrogen until a sample of the reaction mixture remained clear when cooled to room temperature. Approximately 5 hours heating at 220–225° C. was necessary.

The adduct (258 gms.), glycerol diallyl ether (120 gms.), acrylic acid (14.4 gms.), styrene (127.6 gms.) and ditertiary butyl peroxide (2.6 gm.) were heated and stirred to 120° C. under reflux. After heating for one hour at 120° C. the temperature was raised to 150° C. and heating at 150° C. continued for 5 hours. Unreacted monomers were removed at this stage under reduced pressure, until distillation stopped at 150° C. and 25 mm. Hg. The copolymer which had alcoholic acid value 60 mg. KOH per gm. was then cooled below 100° C. and converted to its triethylamine salt by charging water (50 gms.) and triethylamine (59 gms.). This solution was heated at 90–95° C. under reflux for 4 hours and finally cooled to room temperature.

Water dispersible cobalt driers (0.12% cobalt on solid resin) were added to the above triethylamine salt solution which was afterwards thinned with water to 40% solids content. Films spread on glass plates were touch dry in 3–3½ hours and hard dry after air drying overnight. The films were glossy and almost colourless.

Example 3

The fumaric acid-tobacco seed oil adduct of Example 1 (157.5 gms.), sorbitol tetra allyl ether (45 gms.), acrylic acid (6 gms.) vinyl toluene (90 gms.) and ditertiary butyl peroxide (1.5 gms.) were heated and stirred to 120–130° C. Heating at 120–130° C. was continued for 3 hours and then butyl Cellosolve (60 gms.) was charged to the viscous copolymer which had an alcoholic KOH acid value of 60 mg. KOH/gm.

A sample (12 gms.) was stirred with triethylamine (1.5 ml.) and water dispersible cobalt drier containing 6% cobalt metal (0.2 ml). This solution was completely soluble in water and films of the aqueous solution were touch dry in 2 hours and tack free overnight. The films were glossy and mar resistant.

Example 4

A fumaric acid-linseed oil adduct was prepared by heating fumaric acid (250 gms.) and linseed oil (2250 gms.) at 220–225° C. under nitrogen until a sample of the reaction mixture remained clear when cooled to room temperature. Approximately 5 hours heating at 220–225° C. was required.

The adduct (120 gms.), maleic acid (6 gms.), styrene (75 gms.), glycerol diallyl ether (97.5 gms.) and ditertiary butyl peroxide (1.5 gms.) were heated and stirred to 120–130° C. Heating and stirring at 120–130° C. were continued for 6 hours and then the copolymer was cooled to room temperature. It had an alcoholic KOH acid value of 34 mgm. KOH/gm.

A sample (10 gms.) was stirred with butyl Cellosolve (2 gm.) and triethylamine (1.5 ml.) and then water dispersible cobalt driers containing 6% cobalt metal (0.2 ml.) was charged. This solution was completely water soluble and films of the aqueous solution were touch dry in 4 hours, tack free overnight.

Example 5

The fumaric acid-tobacco seed oil adduct of Example 1 (20 gms.), dehydrated caster oil fatty acids (20 gms.) glycerol diallyl ether (30 gms.), acrylic acid (14 gms.), butyl acrylate (56 gms.) styrene (59 gms.) and ditertiary butyl peroxide (1 gm.) were heated and stirred to 120–130° C. After 2 hours at 120–130° C. a viscous copolymer (acid value 75) was obtained and this was thinned with butyl Cellosolve (40 gm.) then cooled to room temperature.

A sample of the solution (12 gms.) was stirred with triethylamine (1.5 ml.) and water dispersible cobalt drier containing 6% cobalt metal (0.2 ml.). This solution of triethylamine salt was completely water soluble and films of the aqueous solution were touch dry in 3½ hours, tack free overnight.

Example 6

A fumaric acid-safflower seed oil adduct was prepared by heating fumaric acid (150 gms.) and safflower seed oil (850 gms.) at 220° C. under nitrogen until a sample was clear hot and remained clear on cooling to room temperature. This required about 11 hours heating at 220° C. The adduct (152 gms.), glycerol diallyl ether (110 gm.) acrylic acid (10.4 gm.), styrene (126.6 gm.) and ditertiary butyl peroxide (2.0 gm.) were heated for 1 hour at 120 C., and then the temperature was raised to 150° C. After 30 minutes at 150° C. a viscous resin was produced and this was cooled rapidly below 100° C. before charging triethylamine (48 gms.) and water (200 mls.) The triethylamine salt solution was refluxed at 90–95° C. for 4 hours to complete salt formation and finally cooled to room temperature.

Films of the aqueous salt solution, containing 0.12% cobalt metal on solid resin as water dispersible cobalt drier, were touch dry in 4 hours and tack free after about 8 hours.

We claim:

1. A process for preparing addition copolymers which comprises addition polymerizing at a temperature in the range of 50°–200° C. a mixture of
    (1) 5–60% by weight of an adduct of (a) a drying oil selected from the group consisting of triglyceride esters of unsaturated fatty acids having at least 12 carbon atoms in the carbon/carbon chain containing the unsaturation and esterified derivatives of the fatty acids with mono- or polyhydric alcohols containing up to 6 carbon atoms with (b) an acylic $\alpha$-unsaturated olefinic polycarboxylic acid or anhydride thereof having a straight chain length of up to 5 carbon atoms in a proportion by weight of (b) in relation to the total weight of (a) and (b) of 5–30%,
    (2) 15–75% by weight of a polyethylenically unsaturated compound containing at least one $\beta,\gamma$-ethylenically unsaturated ether moiety and a polymerizable ethylenically unsaturated moiety,
    (3) 2–10% by weight of an $\alpha,\beta$-ethylenically susaturated carboxylic acid and
    (4) at least 10% by weight of at least one ethylenically unsaturated monomer free from carboxylic acid or carboxylic acid anhydride groups capable of forming addition copolymers with the other components of the mixture to give a copolymer having an acid value of at least 25 milligrams of potassium hydroxide per gram.

2. A process according to claim 1 which further comprises the addition of a chain stopper which has a chain transfer constant for styrene polymerization at 60° C. of at least $0.5 \times 10^{-4}$.

3. A process according to claim 2 wherein the proportion by weight of chain stopper in relation to the total weight of the monomer mixture is less than 60%.

4. A process according to claim 2 wherein the chain stopper is allyl alcohol.

5. A process according to claim 1 wherein the oil is safflower or tobacco seed oil.

6. A process according to claim 1 wherein the acylic $\alpha$-unsaturated olefinic polycarboxylic acid or anhydride is selected from the group consisting of fumaric, maleic, aconitric, itaconic and alkyl substituted maleic acid.

7. A process for preparing an aqueous dispersion of a copolymer salt which comprises addition polymerizing at a temperature in the range of 50° to 200° C. a mixture of
    (1) 5–60% by weight of an adduct of (a) a drying oil selected from the group consisting of triglyceride esters of unsaturated fatty acids having at least 12 carbon atoms in the carbon/carbon chain containing the unsaturation and esterified derivatives of the fatty acids with mono- or polyhydric alcohols containing up to 6 carbon atoms with (b) an acylic $\alpha$-unsaturated olefinic polycarboxylic acid or anhydride thereof having a straight chain length of up to 5 carbon atoms in a proportion by weight of (b) in relation ot the total weight of (a) and (b) of 5–30%,
    (2) 15–75% by weight of a polyethylenically unsaturated compound containing at least one $\beta,\gamma$-ethylenically unsaturated ether moiety and a polymerizable ethylenically unsaturated moiety,
    (3) 2–10% by weight of an $\alpha,\beta$-ethylenically unsaturated carboxylic acid and
    (4) at least 10% by weight of at least one ethylenically unsaturated monomer free from carboxylic acid or carboxylic acid anhydride groups capable of forming addition copolymers with the other components of the mixture to give a copolymer having an acid value of at least 25 milligrams of potassium hydroxide per gram, and dispersing the copolymer in the presence of a base in a solvent selected from the group consisting of water and water containing a water-miscrible solvent.

References Cited

UNITED STATES PATENTS

| | | | |
|---|---|---|---|
| 2,839,514 | 6/1958 | Shokal et al. | 260—88.1 |
| 2,852,487 | 9/1958 | Maker | 260—861 |
| 3,030,321 | 4/1962 | Lombardi et al. | 260—23 |
| 3,098,834 | 7/1963 | Jerabek | 260—23.7 |
| 3,253,938 | 5/1966 | Hunt et al. | 106—252 |

OTHER REFERENCES

Schildknecht: "Vinyl and Related Polymers," 1952, p. 15.

DONALD E. CZALA, *Primary Examiner.*

R. A. WHITE, *Assistant Examiner.*